United States Patent

[11] 3,594,721

[72] Inventors Amotz Frenkel
Lansdale;
Michael Robert Nakonechny, Valley Forge, both of, Pa.
[21] Appl. No. 842,844
[22] Filed July 18, 1969
[45] Patented July 20, 1971
[73] Assignee Transducer Systems, Inc.
Willow Grove, Pa.

[54] VEHICLE BRAKE CONDITION AND OPERATION DETECTING SYSTEM
10 Claims, 5 Drawing Figs.
[52] U.S. Cl. .................................................. 340/52 A
[51] Int. Cl. ............................................ B60q 1/00, B60q 5/00
[50] Field of Search ........................................... 340/52 A, 52 B, 52, 69; 188/1 A

[56] References Cited
UNITED STATES PATENTS
2,087,386  7/1937  Norton ........................ 340/52 (A)
3,282,241  11/1966  Forbush ....................... 188/1 (A)
3,479,640  11/1969  Puma .......................... 340/52 (A)

Primary Examiner—John W. Caldwell
Assistant Examiner—Glen R. Swann, III
Attorney—Jacob Trachtman ABSTRACT: Means for indicating when the brakes of a vehicle are either not operating properly or require relining. The indicator means includes a proximity transducer mounted on the brake shoe and connected to a warning device in the vehicle so as to notify the operator either when the brake shoe does not operate properly or when the lining on the brake shoe becomes too thin and requires replacing.

PATENTED JUL20 1971 3,594,721

INVENTORS
AMOTZ FRENKEL
MICHAEL ROBERT NAKONECHNY
BY
Jacob Trachtman
ATTORNEY

VEHICLE BRAKE CONDITION AND OPERATION DETECTING SYSTEM

FIELD OF INVENTION

The present invention relates to means for indicating whether the brakes of a vehicle are operating properly, and more particularly to means for indicating whether the brake shoes are properly moving when the brake is actuated and when the brake lining becomes to thin and requires replacing.

DESCRIPTION OF PRIOR ART

A major system in the operation of a vehicle is the brake system. Improper operation of the brake system can case both considerable damage to the vehicle and great injury to the passengers of the vehicle. Two factors which cause improper operation of the brake system are failure of one or more of the brake shoes to move against the brake drum when the brakes are actuated by the brake pedal, and the brake linings on the brake shoes becoming too thin because of wear. Although improper operation of all of the brake shoes can be determined by complete failure of the brake system, improper operation of one or a few of the brake shoes is not easily discernable and can cause problems. Heretofore worn brake linings could only be discerned by removing the wheels and visually checking the thickness of the linings. Except where periodic checks of the brake linings are required by state law, it is generally overlooked until it causes trouble in the operation of the vehicle.

It is therefore an object of the present invention to provide means for indicating the improper operation of the brakes of a vehicle.

It is another object of the present invention to provide means for indicating the failure of the brake shoes to move against the brake drum when the brakes are operated.

It is still another object of the present invention to provide means for indicating when the brake linings become too thin because of wear.

SUMMARY OF INVENTION

These objects are achieved by indicator means which includes a proximity transducer mounted on each brake shoe and movable with the brake shoe toward and away from the brake drum. The proximity transducer is of the type having an electrical output which varies in amplitude as a metal member is moved toward and away from the transducer. The output of the transducer is connected through a switch to a warning device in the vehicle. The switch is closed when the brake pedal is depressed to actuate the brakes. If, upon the depression of the brake pedal, the brake shoe does not move toward the brake cylinder, the output of the transducer is high enough to operate the warning device. If the brake shoe does move against the brake cylinder, the output of the transducer decreases to a level that it will not operate the warning device. However, if the brake shoe moves too close to the brake drum because of the brake lining becoming worn, the output of the transducer is sufficiently high to operate the warning device. Thus, there is provided a warning signal if either the brake shoe does not move, or if the brake lining becomes too thin.

BRIEF DESCRIPTION OF DRAWING

For the purpose of illustrating the invention there is shown in the drawings forms which are presently preferred; it being understood, however, that this invention is not limited to the precise arrangements and instrumentalities shown.

DESCRIPTION OF PREFERRED EMBODIMENTS

Figure 3:
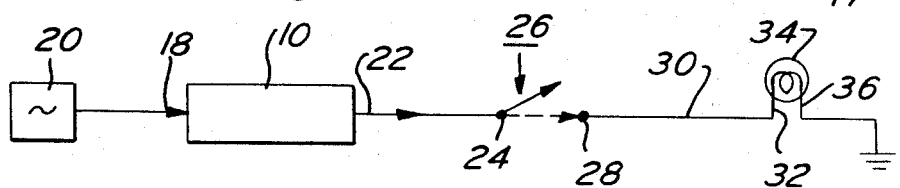
FIG. 3 is a circuit diagram of the indicator means of the present invention.

Referring initially to FIG. 3, the indicator means of the present invention comprises a proximity transducer 10 of the type well known in the art which includes a primary winding, a secondary winding and a metal core extending through the windings so that an input signal applied to the primary winding induces an output signal from the secondary winding. As is well known with regard to such proximity transducers, when a metal member is moved into proximity to the end of the core, the output signal from the transducer will vary even though the input signal is maintained constant.

Figure 2:
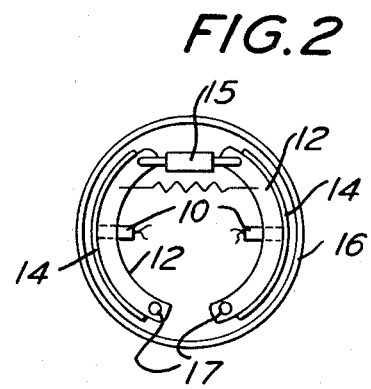
FIG. 2 is a view of a brake with the transducers mounted on the brake shoes.

As shown in FIG. 2, the transducer 10 is mounted on the shoe 12 of the brake with the end of the core being positioned directly under the brake lining 14 on the surface of the shoe 12. Thus, when the brake is applied by stepping on the brake pedal of the vehicle so the actuator 15 pivots the brake shoe 12 about its end 17 and moves the shoe 12 toward the brake drum 16, the end of the core of the transducer is also moved toward the drum 16. When the brake is released, the end of the core of the transducer 10 is carried by the shoe 12 away from the drum 16. The indicator means of the present invention includes a separate transducer 10 mounted on each of the brake shoes 12 of the braking system of the vehicle. Although in FIG. 3 only one transducer 10 is shown, it should be understood that there are a plurality of such transducers, generally eight for a standard vehicle having a brake on each of its wheels, with the transducers being electrically connected in parallel.

The input terminal 18 of the transducer 10 is connected to a source of alternating current 20, which may be energized by the battery of the vehicle. The output terminal 22 of the transducer 10 is connected to one terminal 24 of a switch 26. The switch 26 is connected to the brake pedal of the vehicle so that when the brake pedal is depressed to actuate the brake system, the switch 26 is closed as indicated by the dashed line arrow. When the brake pedal is released the switch is opened as indicated by the full line arrow. The other terminal 28 of the switch 26 is connected by a line 30 to a terminal 32 of a warning device, such as a light 34, mounted on the dash board of the vehicle. The other terminal 36 of the light 34 is connected to ground to complete the circuit. Other warning means, such as a buzzer, can be used instead of or in conjunction with the warning light 34.

In the operation of the indicator means of the present invention, the input signal to the transducer 10 produces an output signal which, when the switch 26 is closed, is fed to the warning light 34. The switch 26 is closed when the operator of the vehicle depresses the brake pedal of the vehicle. This also actuates the brakes so that the brake shoes 12 are normally moved toward the brake drum 16. The brake shoes 12 carry the transducers 10 with them toward the brake drum 16.

Figure 1:
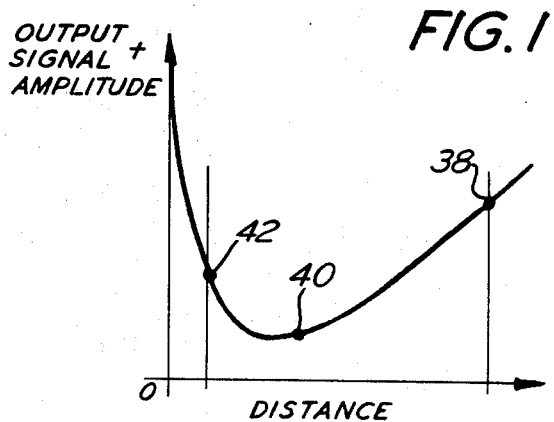
FIG. 1 is a diagram showing the output of the transducer for different distances between the brake shoe and the brake drum.

As previously stated, the output signal of the transducers 10 vary when a metal member is moved closer to the core of the transducer. FIG. 1 is a graph showing the typical variation in the output signal of such a transducer with variations in the distance between the end of the core of the transducer and a metal member. In the graph of FIG. 1, the distance between the core of the transducer and the metal member is along the abscissa and increases from left to right, and the output signal is along the ordinate and increases upwardly. As can be seen in FIG. 1, at a relatively large distance between the core of the transducer and the metal member the output signal of the transducer is large. As the distance between the core of the transducer and the metal member decreases, the output signal of the transducer decreases to a minimum value. Further movement of the metal member toward the end of the core of the transducer causes the output signal of the transducer to increase again rapidly.

In the operation of the indicator means of the present invention, when the brake is in its released condition the brake shoes 12 and their respective transducers 10 are at their furthest distance from the brake drum 16, a metal member, and the output signals of the transducers 10 are at point 38 on the curve of FIG. 1. However, since the switch 26 is open because the brake pedal is not depressed, this high output signal is not fed to the warning light 34. When the brake is applied by depressing the brake pedal, the brake shoes 12 and their transducers 10 are moved closer to the brake drum 16. This decreases the output signals of the transducers 10 to the point 40 on the curve of FIG. 1. Thus, although the switch 26 is closed by the depression of the brake pedal, the output signals of the transducers 10 are low enough that the warning light 34 is not lit. However, if one or more of the brake shoes 12 fails to operate when the brake is applied, the brake shoe and its transducer 10 remains at its maximum distance from the brake drum 16 and the output signal of the transducer remains at its high level of point 38 in the graph of FIG. 1. Since the switch 26 is closed by the depression of the brake pedal, the high output signal of the transducer 10 on the defective brake shoe 12 operates the warning light 34. This provides the operator of the vehicle with an indication that one or more of the brake shoes 12 is not operating properly. The operator can then remove the wheels of the vehicle to determine which brake shoe 12 is defective.

During the operation of the vehicle, the brake linings 14 become worn because of the friction between the brake linings 14 and the brake drums 16 each time the brakes are applied. As the brake linings 14 become worn, the brake shoes 12 and their associated transducers 10 must move closer to the brake drum 16 when the brakes are applied. As can be seen in FIG. 1, this causes the output signal from the transducers 10 to vary through its minimum value. When the brake lining 14 has become so worn that it should be replaced, the brake shoe 12 and its transducer 10 have moved close enough to the drum 16 so that the output signal of the transducer increases to the point 42 on the graph of FIG. 1. This provides an output signal which is large enough to operate the warning light 34 and provide the operator of the vehicle with a warning that the brake lining requires replacement. The operator can then remove the wheels of the vehicle to determine which brake linings require replacement.

Figure 4:
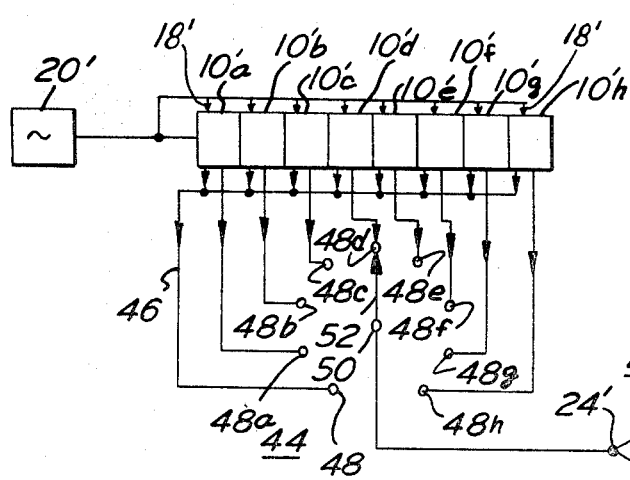
FIG. 4 is a circuit diagram partially in block form of a modification of the indicator means of the present invention.

Referring to FIG. 4, there is shown a modification of the brake indicator means of the present invention that is identical to the brake indicator means of FIG. 3 except that the transducers 10'a through 10'h are connected to the brake pedal operated switch 26' through a multiple contact selector switch 44 which is mounted on the dash board of the vehicle. The input terminals 18' of the transducers 10'a through 10'h are electrically connected in parallel to the source of current 20'. The output terminals of the transducers 10'a through 10'h are electrically connected in parallel through line 46 to one fixed contact 48 of the switch 44. The output terminals of each of the transducers 10'a through 10'h are also each electrically connected to separate fixed contact 48a through 48h respectively of the switch 44. The terminal 50 of the movable contact 52 is connected to one terminal 24' of the brake pedal operated switch 26'. The other terminal 28' of the switch 26' is connected to one terminal 32' of the warning light 34', and the other terminal 36' of the warning light is grounded.

In the operation of this modification of the brake indicator means of the present invention, the operator of the vehicle places the movable contact 52 of the switch 44 on the fixed contact 48 so that all of the transducers 10'a through 10'h are connected in parallel to the warning light 34' through the brake pedal operated switch 26'. The brake indicator means then operates in the same manner described above with regard to the indicator means shown in FIG. 3. When there is a defect in one or more of the brake shoes, either because the brake shoe does not move or because the brake lining becomes too worn, which causes the lighting of the warning light 34', the operator then moves the movable contact 52 to the fixed contact 48a. If the brake shoe on which the transducer 10'a is mounted is in good operating condition, the warning light 34' will go out. However, if this brake shoe is defective, the warning light 34' will remain lit. Thus, by successively moving the moving contact 52 to the various fixed contacts 48a through 48h, the operator can determine which of the brake shoes is defective. This permits the operator to determine which of the brake shoes is defective without removing all of the wheels of the vehicle so as to save considerable time in finding and repairing the specific defective brake shoe. Of course the system can be provided with means for automatically sequentially scanning the outputs of all of the transducers to determine which brake shoe is defective and indicating this information as will be evident to those skilled in the art.

Figure 5:
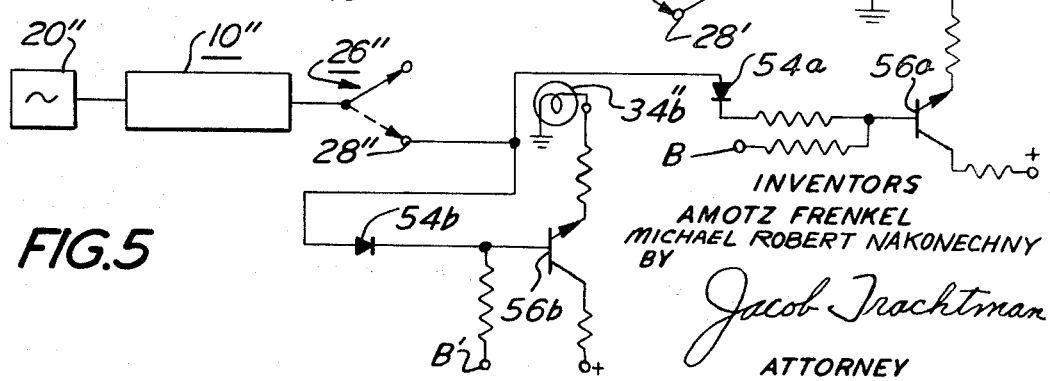
FIG. 5 is a circuit diagram partially in block form of still another modification of the indicator means of the present invention.

Referring to FIG. 5, there is shown still another modification of the brake indicator means of the present invention. This form of the brake indicator means is identical to that shown in FIG. 3 except that the output of the transducer 10" is connected through the brake pedal operated switch 26" to two separate warning lights 34"a and 34"b. The switch 26" is connected to the warning light 34"a by terminal 28" through a diode 54a and a transistor 56a, and is connected to the warning light 34"b through a diode 54b and a transistor 56b. The bias B and the resistors in the circuit with the transistor 56a make the transistor 56a a high biased transistor, whereas the bias B' and the resistors in the circuit with the transistor 56b make the transistor 56b a low biased transistor. Thus, a higher valued signal is required to trigger the transistor 56a than is required to trigger the transistor 56b. Like in the indicating means of FIG. 3, there are a plurality of the transducers 10" which are electrically connected in parallel, and which are provided with an input signal from the source of electrical current 20".

This modification of the brake indicator means operates in the same manner as previously described with regard to the brake indicator means of FIG. 3. However, as shown in FIG. 1, the output signal from the transducer 10" when the brake lining becomes too thin, the value at point 42, is lower than the output signal when the brake shoe fails to move, the value at point 38. Thus, when the brake lining becomes too thin, the output signal from the transducer 10" will be of a value which will only trigger the low biased transistor 56b so as to light the warning light 34"b. However, if the brake shoe fails to move upon the actuation of the brakes, the output signal of the transducer 10" will be of sufficient value to trigger both transistors 56a and 56b so as to light both warning lights 34"a and 34"b. Thus, if only the warning light 34"b lights, the operator knows that the defect in the brakes is the brake lining becoming too thin. However, if both warning lights 34"a and 34"b light up, the operator knows that the defect is caused by a failure of a brake shoe to move. The warning lights 34"a and 34"b can be of different colors so as to permit the operator of the vehicle to distinguish between them. Thus, this modification of the brake indicating means of the present invention informs the operator of the vehicle as to the cause of the defect in the brake system. If desired, a multicontact selector switch, such as the switch 44 in the brake indicator means of FIG. 4, can be provided between the transducers 10" and the brake pedal operated switch 26" so that the operator of the vehicle can determine which brake shoe is defective without removing all of the wheels of the vehicle.

Thus the brake indicator means of the present invention provides the operator of the vehicle with an indication as to a defect in the brake system. It also provides an indication as to which brake shoe is defective, and whether the defect is a failure of the brake shoe to operate or an overly worn brake lining. Although the brake indicator means is shown in a brake system having a cylindrical brake drum, the brake indicator means can be used in a disc brake system or any other type of brake system in which a brake shoe is moved against a metal member.

The present invention may be embodied in other specific forms without departing from the spirit or essential attributes thereof and, accordingly, reference should be made to the appended claims, rather than to the foregoing specification as indicating the scope of the invention.

What we claim is:

1. In the brake system of a vehicle having a brake shoe, a lining on the brake shoe, and brake operating means actuated for moving said brake shoe against a metal member, the combination comprising a defect indicator means comprising a proximity transducer with an input and output mounted on the brake shoe for movement with said shoe toward said metal member, a source of electrical current connected to the input of said transducer, a warning device for energization by said transducer, and means connecting the output of said transducer to the warning device when said brake operating means is actuated.

2. The means of claim 1 in which the proximity transducer provides a low output signal when the brake lining normally engages the metal member with a normal lining thickness, and a high output signal when the brake lining becomes overly worn.

3. The means of claim 2 in which the proximity transducer also provides a high output signal when the brake shoe is away from said metal member.

4. The means of claim 3 in which the means connecting the output of the transducer to the warning device includes a switch which is normally open and which is closed when the brake operating means is actuated.

5. The means of claim 4 including a plurality of proximity transducers, each of said transducers being mounted on a separate brake shoe, the inputs of said transducers being energized by a source of electrical current and the outputs of said transducers being connected in parallel to said switch.

6. The means of claim 5 including a multicontact selector switch having a plurality of fixed contacts equal in number to one more than the number of transducers and a movable contact which is movable along the fixed contacts, the outputs of the transducers being connected in parallel to one of the fixed contacts of the selector switch, the outputs of each of the transducers being also connected to a separate one of the other of the fixed contacts of the selector switch, and the movable contact being connected to the first named switch.

7. The means of claim 4 including two warning devices, separate means connecting the switch to each of said warning devices so that a larger signal is required to operate one of the warning devices than is required to operate the other warning device, and wherein said transducer produces when said brake operating means is actuated a higher output signal when its brake shoe fails to move than when the brake lining on said shoe becomes overly worn.

8. The means of claim 7 in which each of the means connecting the switch to each of the warning devices includes a transistor with one of the transistors being provided with higher bias than the other transistor.

9. The means of claim 8 including a plurality of proximity transducers, each of said transducers being mounted on a separate brake shoe, the inputs of said transducers being energized by a source of electrical current and the outputs of said transducers being connected in parallel to said switch.

10. The means of claim 9 including a multicontact selector switch having a plurality of fixed contacts equal in number to one more than the number of transducers and a movable contact which is movable along the fixed contacts, the outputs of the transducers being connected in parallel to one of the fixed contacts of the selector switch, the outputs of each of the transducers being also connected to a separate one of the other of the fixed contacts of the selector switch, and the movable contact being connected to the first named switch.